(12) United States Patent
Uytterhaeghe et al.

(10) Patent No.: US 6,231,094 B1
(45) Date of Patent: May 15, 2001

(54) FENDER BEAM AND METHOD FOR MAKING SAME

(75) Inventors: Luc Uytterhaeghe, Arbent; Francis Cordebar, Oyonnax; Olivier Cornet, Langres, all of (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 09/230,103
(22) PCT Filed: May 22, 1998
(86) PCT No.: PCT/FR98/01031
  § 371 Date: Jan. 22, 1999
  § 102(e) Date: Jan. 22, 1999
(87) PCT Pub. No.: WO98/52793
  PCT Pub. Date: Nov. 26, 1998

(30) Foreign Application Priority Data

May 23, 1997 (FR) .................................................. 97 06335

(51) Int. Cl.[7] .................................................. B60R 19/03
(52) U.S. Cl. ........................ 293/122; 293/120; 264/257; 264/320
(58) Field of Search .................................. 293/120, 121, 293/122; 264/257, 258, 320, 324

(56) References Cited

U.S. PATENT DOCUMENTS

| | | | |
|---|---|---|---|
| 3,933,387 | * 1/1976 | Salloum et al. | 293/120 |
| 4,671,550 | * 6/1987 | Molnar | 293/120 |
| 4,749,613 | 6/1988 | Yamada et al. | |
| 4,904,008 | * 2/1990 | Glance | 293/120 |
| 4,986,948 | * 1/1991 | Komiya et al. | 264/257 |
| 5,037,599 | * 8/1991 | Olson | 264/510 |
| 5,141,273 | * 8/1992 | Freeman | 293/122 |
| 5,290,079 | * 3/1994 | Syamal | 293/120 |
| 5,927,778 | * 7/1999 | Uytterhaeghe et al. | 264/257 X |
| 6,004,650 | * 12/1999 | Schweizer et al. | 264/257 X |

FOREIGN PATENT DOCUMENTS 2749535    12/1997  (FR) .

OTHER PUBLICATIONS

"Plastiques et materiaux nouveaux en automobile: allier economie et solutions originales", Ingerieurs de l'Automobile, No. 711, Mar. '97, pp. 24–30, XP000687638.

Patent Abstracts of Japan, vol. 016, No. 538 (M–1335), Nov. 9, 1992.

Patent Abstracts of Japan, vo.1016, No. 549 (M–1338), Nov. 18, 1992.

* cited by examiner

Primary Examiner—Joseph D. Pape
(74) Attorney, Agent, or Firm—Oliff & Berridge, PLC

(57) ABSTRACT

The invention relates to a bumper beam obtained by molding a moldable thermoplastic material and a drapeable thermoplastic material having continuous fibers and presented in the form of sheets. The cross-section of the beam presents a developed length that is constant. The invention also relates to a method of making such a beam.

8 Claims, 3 Drawing Sheets

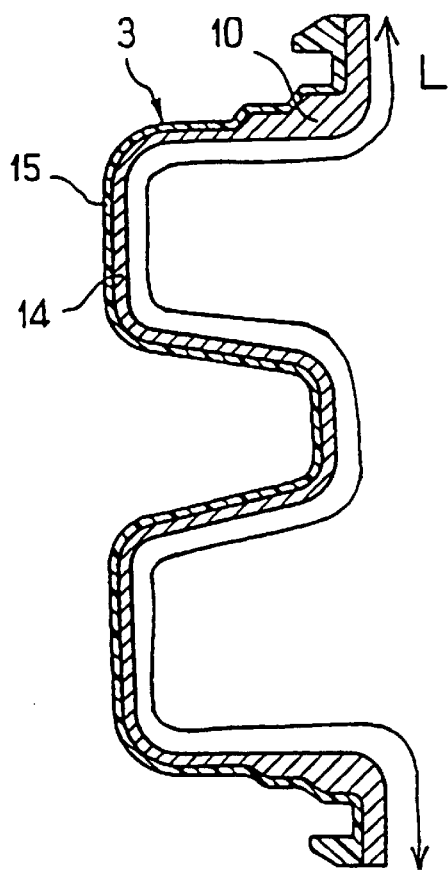
FIG_2
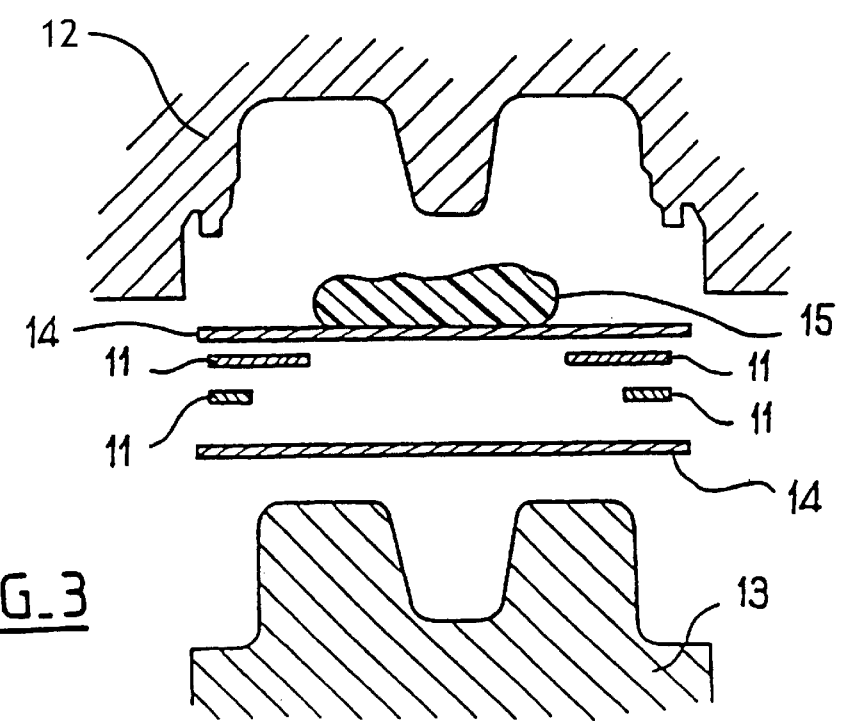
FIG_3

FENDER BEAM AND METHOD FOR MAKING SAME

The present invention relates to a bumper beam, and to a method of making it.

BACKGROUND OF THE INVENTION

It is known that certain types of motor vehicle bumper comprise a shield or outer skin, a beam which provides the mechanical strength of the bumper, and optionally local shock-absorbers interposed between the beam and the side members of the vehicle to absorb the energy of an impact.

Both the beam and the local shock-absorbers are known for being relatively expensive to make, which gives rise to difficulty when repairing a damaged vehicle.

OBJECTS AND SUMMARY OF THE INVENTION

The present invention seeks to solve those drawbacks by providing a bumper beam of a novel type.

The present invention provides a bumper beam obtained by molding a moldable thermoplastic material and a drapeable thermoplastic material having continuous fibers.

In cross-section, the beam presents a developed length that is constant.

This characteristic makes it possible to use a rectangular sheet of thermoplastic material having continuous fibers for molding the beam, with the width of the sheet corresponding to the developed length of the cross-section of the beam.

In the present description the term "moldable" means that the thermoplastic material is suitable for flowing in a mold to fill all of the cavities thereof, however deep they may be, and the term "drapeable thermoplastic material" means a thermoplastic material in the form of an optionally preconsolidated textile cloth which, during molding, is capable only of deforming, while substantially conserving its initial thickness.

For the drapeable thermoplastic material having continuous fibers, it is possible to use preimpregnated thermoplastics of the "Twintex" type from Vetrotex or of the "Tepex" type from DuPont de Nemours.

In a particular embodiment, the beam includes thickenings of thermoplastic material having continuous fibers.

The present invention also provides a method of making a beam as described above.

This method consists in defining a mold such that the cross-section of its cavity presents a developed length that is substantially constant, in placing a rectangular sheet of a drapeable thermoplastic material having continuous fibers in the mold when open, and in delivering the moldable thermoplastic material into the mold to mold the beam.

In the invention, the plastic material can be delivered by injection, by injection-compression, or by extrusion-compression.

In a preferred variant of this embodiment, which is particularly adapted to the techniques of injection-compression and of extrusion-compression, a mold is used that has a positive joint plane and a moldable thermoplastic material is delivered into the open mold, e.g. by injection or by extrusion, and then the mold is closed to compress the two thermoplastic materials and to cause the mold cavity to be filled.

In a particular implementation of this variant, patches of thermoplastic material having continuous fibers are held captive between two rectangular sheets of drapeable thermoplastic material at locations in the cavity corresponding to thickenings of the beam, and the moldable thermoplastic material having a large flow coefficient is placed on a side of one of the rectangular sheets opposite from its side adjacent to the patches, prior to the mold being closed.

This ensures that the patches do not move inside the mold while the moldable thermoplastic material is flowing.

BRIEF DESCRIPTION OF THE DRAWINGS

In order to make the invention better understood, there follows a description of an embodiment given by way of non-limiting example with reference to the accompanying drawings, in which:

FIG. 2 is a cross-section view of the bumper beam; and

MORE DETAILED DESCRIPTION

Figure 1:
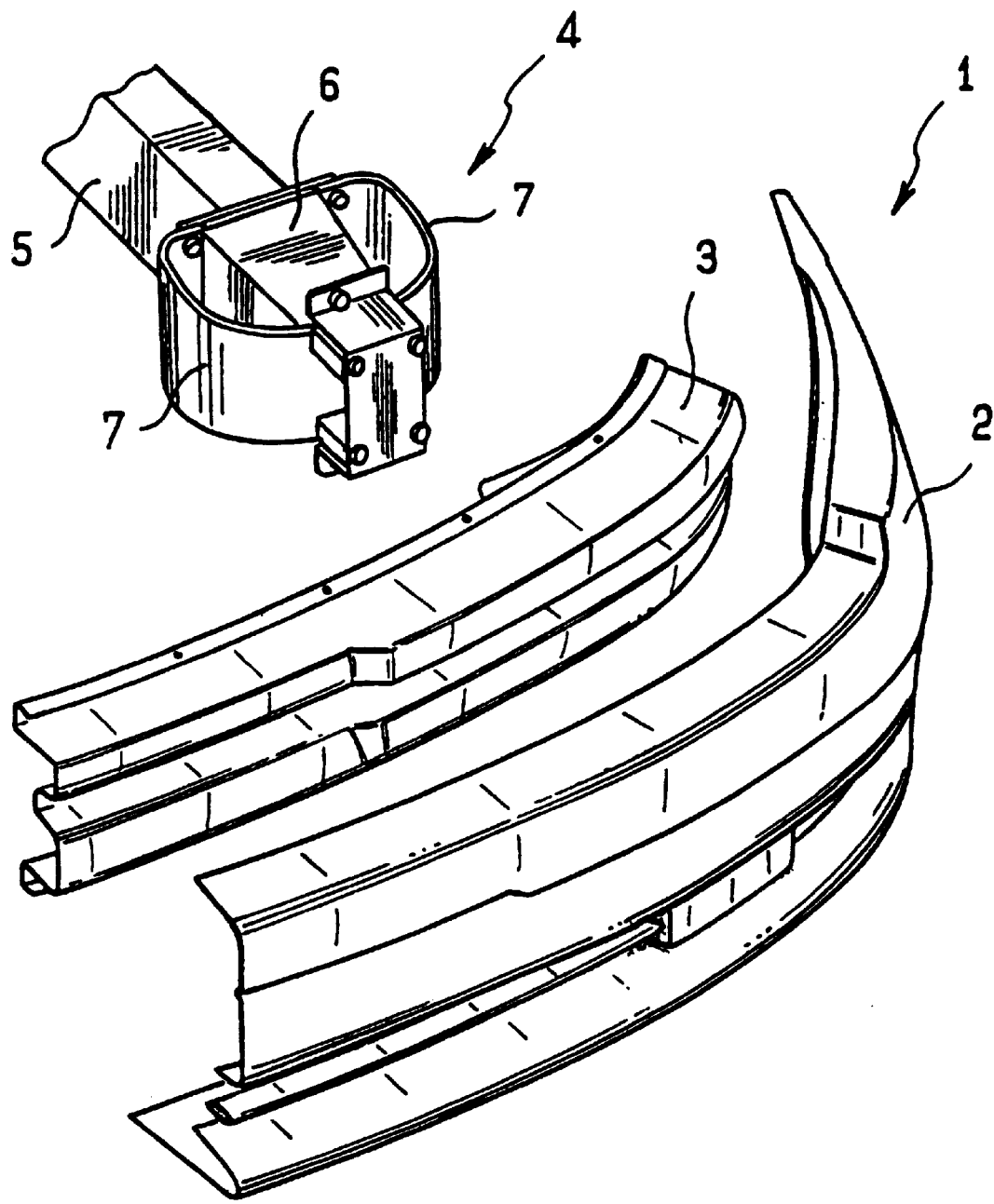
FIG. 1 is a perspective view of one end of a bumper in a partially exploded view.

In the embodiment shown, the bumper 1 comprises a shield 2, a beam 3, and two local shock-absorbers 4, only one of which is visible in the figures.

Each shock-absorber 4 is mounted at the end of a side member 5 of the vehicle and comprises a high-efficiency shock-absorber element 6 e.g. constituted by polycarbonate extruded as a honeycomb presenting the form of a truncated pyramid of rectangular section.

The shock-absorber also has an elastic member constituted by two U-shaped pieces 7 whose ends are spaced apart by a distance substantially equal to the length of the shock-absorber element.

FIG. 2 shows a cross-section of the beam 3.

The developed length L of this section is constant, whatever the section plane under consideration.

The beam has local thickenings 10 which are obtained by stacking patches 11 of drapeable thermoplastic material having continuous fibers, that are suitably positioned within the mold 12, 13.

Figure 3A:
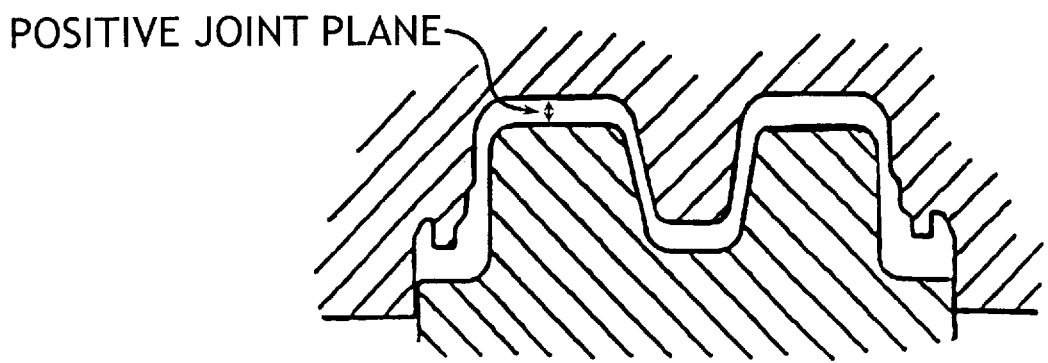
FIG. 3 shows how the sheets and the patches of continuous fiber material are positioned in the mold when making the beam.

FIG. 3 shows the locations of the patches 11 inside the mold before the moldable thermoplastic material 15 is delivered thereto and the mold is closed.

The patches 11 are held captive between two rectangular sheets 14 of drapeable thermoplastic material which preferably comprise continuous fibers, so that when the mold is closed, the flow of the thermoplastic material 15 does not cause the patches 11 to move into inappropriate locations in the mold.

Once molding has been performed, the thickenings 10 are obtained as can be seen in FIG. 2.

Naturally, the embodiments and the implementation described above are not limiting in any way and can receive any desirable modification without thereby going beyond the ambient of the invention.

What is claimed is:

1. A method of manufacturing a bumper beam presenting an open cross-section of constant length, including the steps of:
    a. providing a mold with a cavity having a cross-section which presents a constant developed length;
    b. placing in said mold two rectangular sheets of drapeable thermoplastic material having continuous fibers with separate patches of thermoplastic material having continuous fibers being sandwiched between said sheets;

c. said mold having two parts, their coming together not being limited by any stop;

d. delivering moldable thermoplastic material into the open mold, on a side of one of said rectangular sheets opposite the side adjacent the patches;

e. closing the mold to compress all the thermoplastic materials and to fill the mold cavity with said materials.

2. A method of manufacturing a bumper beam having an open cross section of a constant developed length, comprising:

providing a mold with a cavity having a cross section that presents the constant developed length;

placing at least one sheet of drapeable thermoplastic material, comprising continuous fibers in a thermoplastic material, in the mold when open, the sheet having a width that corresponds to the constant developed length; and delivering moldable thermoplastic material into the mold.

3. The method according to claim 2, further comprising:

closing the mold after delivery of the moldable thermoplastic material to compress the at least one sheet and the moldable thermoplastic material and fill the mold cavity.

4. The method according to claim 2, further comprising:

placing two sheets of drapeable thermoplastic material, comprising continuous fibers in a thermoplastic material, in the mold when open, each sheet having a width that corresponds to the constant developed length;

placing patches of drapeable thermoplastic material, comprising continuous fibers in a thermoplastic material, between the two sheets, wherein the moldable thermoplastic material is placed on a side of one of the two sheets opposite a side adjacent to the patches.

5. The method according to claim 2, wherein the moldable thermoplastic material is delivered by at least one of injection, injection-compression, and extrusion-compression.

6. A bumper beam, comprising:

at least one sheet of drapeable thermoplastic material, comprising continuous fibers in a thermoplastic material, the at least one sheet having an open cross section of a constant developed length; and a moldable thermoplastic material molded to the at least one sheet, the moldable thermoplastic material having an open cross section and a constant developed length corresponding to the open cross section and the constant developed length of the at least one sheet.

7. The bumperbeam of claim 6, further comprising:

two sheets of drapeable thermoplastic material, comprising continuous fibers in a thermoplastic material; and at least two patches of drapeable thermoplastic material, comprising continuous fibers in a thermoplastic material, located between the two sheets.

8. A bumper beam, comprising:

at least one sheet of drapeable thermoplastic material, comprising continuous fibers in a thermoplastic material, the at least one sheet having an open cross section of a constant developed length; and a moldable thermoplastic material molded to the at least one sheet, the moldable thermoplastic material having an open cross section and a constant developed length corresponding to the open cross section and the constant developed length of the at least one sheet, the bumper beam manufactured by a method comprising:

providing a mold with a cavity having a cross section that presents the constant developed length;

placing at least one sheet of drapeable thermoplastic material, comprising continuous fibers in a thermoplastic material, in the mold when open, the sheet having a width that corresponds to the constant developed length; and delivering moldable thermoplastic material into the mold.

* * * * *

UNITED STATES PATENT AND TRADEMARK OFFICE
CERTIFICATE OF CORRECTION

PATENT NO.    : 6,231,094 B1
DATED         : May 15, 2001
INVENTOR(S)   : Luc Uytterhaeghe et al.

It is certified that error appears in the above-identified patent and that said Letters Patent is hereby corrected as shown below:

Title page,
Item [73], Assignee, change "Lyons" to -- Lyon --.

Signed and Sealed this

Fifth Day of February, 2002

Attest:

Attesting Officer

JAMES E. ROGAN
*Director of the United States Patent and Trademark Office*